United States Patent [19]

Waggoner et al.

[11] 4,151,253

[45] Apr. 24, 1979

[54] HIGH-PRECISION PRESSURE

[75] Inventors: Clinton A. Waggoner; Murdock E. Schmitz, both of Victoria, Canada

[73] Assignee: Her Majesty the Queen in right of Canada as represented by the Minister of National Defence, Canada

[21] Appl. No.: 891,923

[22] Filed: Mar. 30, 1978

[30] Foreign Application Priority Data

Apr. 26, 1977 [CA] Canada ................................. 276987

[51] Int. Cl.² ........................ B01L 1/00; G01N 31/00
[52] U.S. Cl. .................................... 422/68; 23/230 R;
    215/260; 220/209; 422/102; 422/103; 356/36;
    356/315
[58] Field of Search ....................... 23/259, 292, 290.5,
    23/253 PC; 215/260, 270; 220/203, 209, 256

[56] References Cited

U.S. PATENT DOCUMENTS

| 3,497,395 | 2/1970 | Kohen | 220/203 X |
| 3,504,822 | 4/1970 | Haloski | 220/203 |
| 3,933,440 | 1/1976 | Woolley | 23/259 |
| 4,013,419 | 3/1977 | Betzer et al. | 23/259 |

OTHER PUBLICATIONS

Cybura, "Heating Block for Pressure Vessels", Lab. Pract., (G.B.), vol. 25, No. 3, (Mar. 1976).

Primary Examiner—Sidney Marantz
Assistant Examiner—Arnold Turk
Attorney, Agent, or Firm—Cushman, Darby & Cushman

[57] ABSTRACT

A pressure reactor which avoids leakage and prevents sample loss upon depressurization. Leakage is avoided by providing a reaction vessel with a screw-threaded closure member. Loss of sample is prevented by the provision of a vapor trap which collects any liquid or vapor which may include dissolved sample, from escaping upon disassembly i.e. de-pressurization of the reactor. A novel solvent system for use in conjunction with the reactor is also disclosed.

4 Claims, 3 Drawing Figures

HIGH-PRECISION PRESSURE

This invention relates to the field of atomic absorption analysis, and in particular to an apparatus used in the preparation of samples therefore. In atomic absorption analysis, samples must be in solution, and for optimum results, the sample must be completely dissolved. This is often a problem, especially when the sample contains silicon.

Silicon is an important alloying constituent of aluminium alloys, especially those classed as cast or foundry alloys, to which it imparts the properties of excellent castability, good corrosion resistance and weldability. Several spectrographic procedures have been proposed for the direct determiniation of silicon in solid alloys samples, but few methods are available for determining the element directly in dissolved samples, principally because of difficulties in dissolving alloys with high silicon content. Dissolution procedures have been devised for application of the atomic absorption method, but these have not been entirely satisfactory. For example, the use of sodium hydroxide as principal solvent introduces a high salt concentration which may cause burner clogging, and requires a corresponding addition of sodium salt to the standards to minimize interference.

Another proposal involves a solvent mixture of hydrochloric acid, hydrofluoric acid and hydrogen peroxide for aluminium alloys. This solvent performs satisfactorily for alloys with relatively low silicon content i.e. less than 5%, but with higher silicon contents complete alloy dissolution is a very time-consuming process often requiring digestion in excess of ten hours to dissolve an elemental silicon film that adheres to the beaker wall. Also, sodium additions are prescribed, thus introducing the attendant problems of burner clogging and absorption interference mentioned above.

Moreover, failure to dissolve silicon completely may affect analytical results for other elements. For example, researchers have found it necessary to recover magnesium and copper from insoluble siliceous residue to avoid analytical errors in their determination.

All of the above techniques for aluminum alloy dissolution have shortcomings. Foremost is the fact that no single solvent treatment is sufficiently potent to completely dissolve all of the important alloying elements that are potentially determinable by atomic absorption spectrometry. Most of the elements are readily soluble in hydrochloric acid or nitric acid, but silicon, a relatively frequent constituent, is insoluble in these and other common solvents. A second disadvantage of these methods is that they require a considerable amount of time and effort in the preparation of the sample.

In recent years, much use has been made of pressurized reactors of various designs to expedite the dissolution of siliceous materials. Such apparatus relies on the pressurizing of a closed reaction vessel by gases generated during the chemical reaction between the solvent and sample. This technique usually accomplishes the task with solvents incorporating hydrofluoric acid, which would not be effective under normal atmospheric conditions. The procedure has been applied to a variety of siliceous materials, including rocks and ores and marine deposits.

In general, pressurized reactors have been developed specifically to provide an effective and safe method for dissolving rock, minerals, silicates, glass, nitrides and similar materials in hydrofluoric, hydrochloric and other strong mineral acids; and to digest organic materials in strong alkalis or oxidizing agents, prior to chemical analysis of the dissolved or digested material.

One of these devices known as the Parr 4745 Acid Digestion Bomb is available from Parr Instrument Company of Moline, Illinois. This unit consists of a 25 c.c. teflon (trade mark for polytetrafluoroethylene) reaction vessel with a wedge-shaped rim and a matching peripherally v-notched cover encased by a close-fitting metal body assembly. To seal the bomb, a a circular top plate in the outer assembly is tightened under spring tension against the teflon ® cover by means of a screw cap. Trials with this bomb showed that complete dissolution of aluminum alloy samples containing up to about 11.5%/w silicon and weighing up to 125 mg could be accomplished with a solvent mixture comprising by volume, 30% concentrated HCl, 10% concentrated $HNO_3$, 10% concentrated HF and 50% distilled water. However, leakage problems were encountered which resulted in loss of sample and corrosion of the inner wall of the metal housing.

Additional drawbacks of this device include lack of means for recovering any pressurized vapour, which may include dissolved sample released when the bomb is disassembled, i.e. de-pressurized and failure to provide means for isolating the sample from the solvent until the bomb is closed.

More specifically, Parr advertises operating limits on pressure and temperature, namely, 1200 psig and 150° C., which may not be exceeded, presumably, otherwise the bomb will leak resulting in loss of sample. Both temperature and pressure created within the reaction vessel depend upon the amount and composition of both solvent and sample, as well as the size of the reaction vessel which is fixed at 25 c.c. The basic gas equation, as follows applies:

$$\frac{pressure \times volume}{temperature} = constant.$$

These parameters can be varied within the temperature and pressure limitations of the teflon vessel. For example, if the vessel volume is doubled, the reaction temperature (sample charge) can be doubled without changing the pressure. One can stay within these limits by keeping the amounts of reactants small and/or by using a solvent system which is not overly reactive i.e. one which is not overly exothermic and which does not result in excessive pressure increases, during reaction with the sample.

However, a highly reactive solvent system is required in order to dissolve certain difficulty soluble samples e.g. aluminum alloys of high silicon content i.e. of the order of 2–20%/w, marine sediments, clay and granite. It was found by applicant that the leakage problem could be avoided by limiting the sample sizes to about 50 mg. However, loss of pressurized vapour containing dissolved sample upon de-pressurization of the bomb could not be prevented. Moreover, due to the small size (25 c.c.) of the reaction vessel only small samples (50 mg) could be accommodated. Parr's bomb design is thus an inefficient means for dissolving these more difficulty soluble samples.

It is therefore proposed by applicant to modify Parr's design to prevent leakage and loss of sample in the form of pressurized vapors and to accommodate larger samples when using a highly reactive solvent system.

Applicant has also found that the technique of utilizing the aluminum/acid reaction i.e. by the addition of a small amount of aluminum powder as catalyst to generate rapidly heat (exothermic reaction) and pressure (due to the formation of hydrogen gas) internally in the reactor is effective in accelerating the dissolution of such siliceous materials as marine sediment, clay, rock (specifically granite) and elemental silicon, and thus overcomes the necessity for external heat application employed by others including Parr, which, owing to the poor heat treansfer property of the teflon ® reaction vessel, is time-consuming i.e. up to $3\frac{1}{2}$ hours treatment time.

Accordingly, it is an object of the present invention to provide a novel pressure reactor which avoids leakage and prevents loss of reaction products during vapour de-pressurization.

It is another object of the invention to provide for the collection of residual pressurized vapour which may include dissolved sample, released upon disassembly of the reactor.

It is a further object of the invention to provide means for isolating vigorously reacting materials from each other prior to assembly of the novel apparatus.

It is yet another object of the invention to provide a method of dissolving siliceous materials of high silicon content using a novel solvent composition in conjunction with the apparatus according to the invention.

According to one aspect of the invention, an improved pressurized reactor is provided, said reactor comprising an outer casing, a close-fitting reaction vessel adapted to be received within said other casing, a first closure member for said reaction vessel, and a second closure member for said casing to prevent the first closure member from becoming unseated when the reaction vessel is pressurized, the improvement comprising means for collecting reactants which tend to escape upon de-pressuriation of the apparatus.

According to another aspect of the invention, a method for the dissolution of siliceous materials is contemplated, which involves reacting a sample of said material with a solvent comprising by volume, a mixture of 15–30% concentrated HCl, 10% concentrated $HNO_3$, 10–50% concentrated HF and 25–50% distilled water, in an apparatus as described in the preceeding paragraph.

In the drawings which serve to illustrate a preferred embodiment of the invention.

Figure 1:
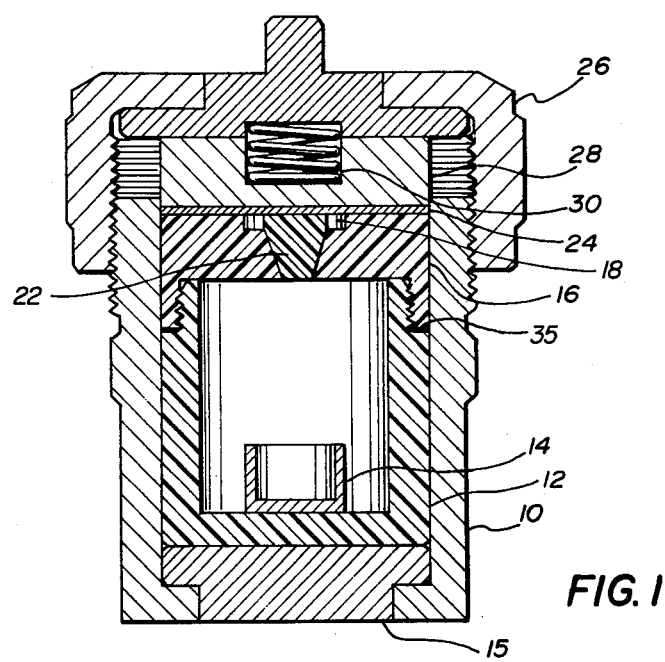
FIG. 1 is a side elevation in section of the apparatus according to the invention.
Figure 2:
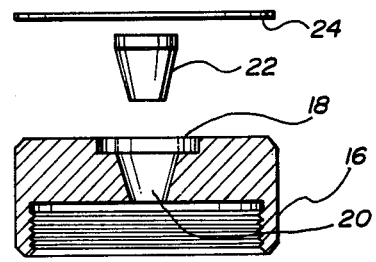
FIG. 2 is a side elevation in section illustrating the assembly of the reaction vessel according to the invention.
Figure 2:
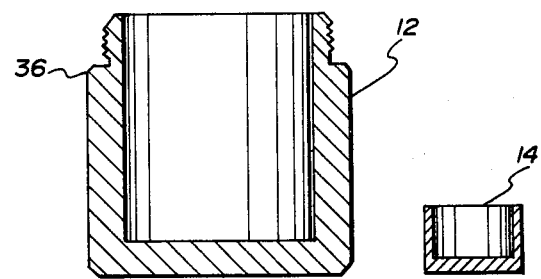
Figure 3:
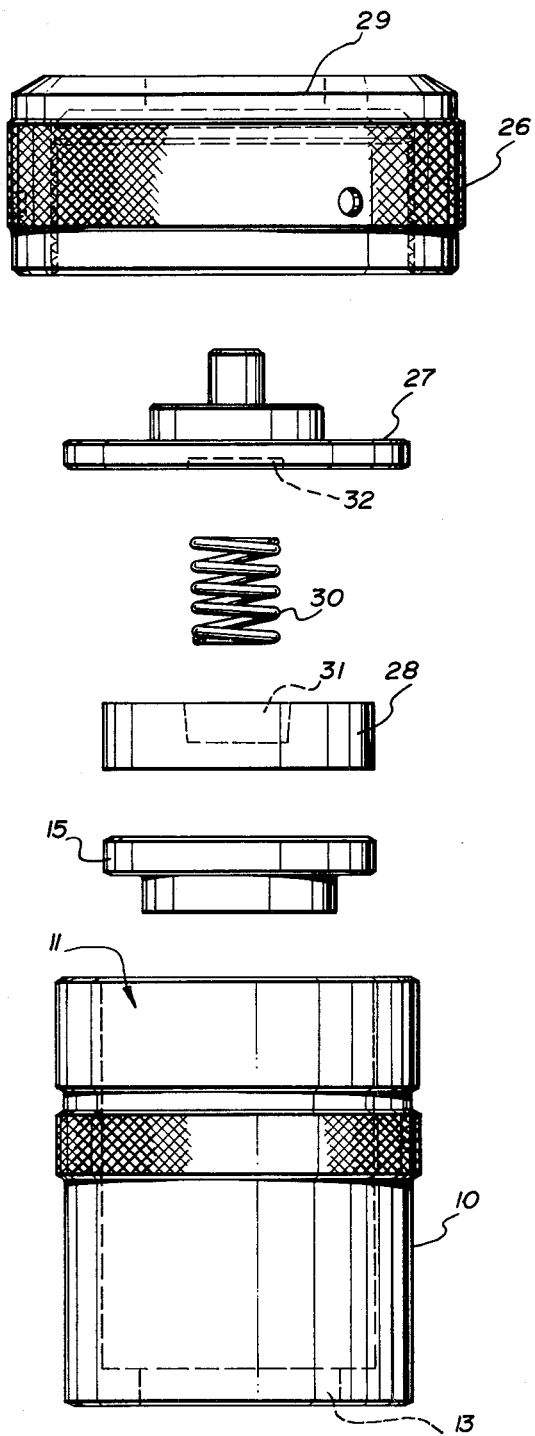
FIG. 3 is a side elevation in section depicting the assembly of the casing according to the invention.

Referring to the drawings, an outer casing 10 is provided. The casing 10 is cylindrical in form and includes a top opening 11 for receiving a close-fitting reaction vessel 12 and a bottom opening 13 closed by a member 15. The member 15 may be removed from the casing through the top opening 11 but when in place bears against the casing 10 to maintain the positioning of the vessel 12.

A sample retaining container 14 is adapted to be received inside the reaction vessel 12 and to isolate the sample from the solvent during assembly of the apparatus, conveniently, in the form of an open cup. The outer section of reaction vessel 12 is threaded to accommodate a matching threaded cover 16 which, when properly tightened, seals the vessel to prevent leakage of the reaction products. When tight, a visible 35 should be evident between the bottom edge of the cover and the shoulder of the vessel 36. This avoids the risk of a leaky seal should the bottom edge of the cover 16 and the vessel shoulder 36 come in contact while tightening and exert an uneven stress on the mating threads.

Vessels of various capacities, for example, 25 c.c. and 50 c.c. may be used, depending on the requirements of the user. A 25 c.c. vessel can accommodate samples up to 125 mg and a 50 c.c. vessel samples up to 250 mg.

Means is provided for collecting reactants which tend to escape in the form of sample in dissolved liquid or pressurized vapor, upon de-pressurization of the reactor.

The cover 16 includes a vapor trap 18 to provide for recovery and collection of residual vapors resulting from the reaction, which may contain dissolved sample.

An opening 20 is provided in the top of the cover 16. The opening 20 is stopped by a removable pressure relief plug 22. When the plug 22 is in place, the vapour trap 18 is defined by the remaining annular depression.

A diaphragm 24 is provided to prevent contact of the reaction products with the outer metal casing 10.

The purpose of the vapor trap is to collect vapor as condensate that might escape from the vessel during de-pressurization of the apparatus. Experimentation showed that, on disassembly, when the pressure is released appreciable recoverable liquid may have collected in the trap 18 on the underside of the diaphragm 24. Without the trap, this condensate would be lost as vapor to the atmosphere and/or would attack the metal casing and, in any event, would lead to analytical error.

The open-topped outer casing 10 is closed by a screw-threaded cap 26 and a cover 27 which protrudes through a central opening 29 in the cap.

The reaction vessel 12 is maintained in position by a pressure disc 28. The disc 28 is tightened under tension by a coil spring 30, as the cap 26 is screwed onto the casing 10. Recesses 31 and 32 in the pressure plate 28 and in the cover 27, respectively, are provided to accommodate the spring 30.

The reaction vessel, its cover, the sample cup, the pressure relief plug and the diaphragm are all constructed of a material not subject to corrosion by the solvent. Teflon ® is an appropriate material.

The teflon ® parts used in this apparatus are interchangeable and can be replaced if they become damaged or contaminated. Although teflon ® is not noticeably dissolved by strong acids, it may not be completely impervious to penetration by hydroflouric, hydrochloric and other strong acid vapors. After repeated use, the various parts may therefore acquire an acid odour or show othr evidence that acid has migrated into the plastic.

If this introduces the possibility of unwanted contamination when working with different samples, separate units should be used for treating different materials and for handling individual acids.

The enclosure, including the casing, cap, cover, pressure disc and bottom closure are all conveniently made of austenitic stainless steel, preferably type 316, to minimize corrosion.

To assemble the apparatus, the bottom closure 15 is seated flush with the bottom of the outer casing 10. The reaction vessel 12 is assembled with the sample cup 14 standing upright inside. The cover 16 is tightly screwed onto the vessel 12. The assembled vessel is then inserted into the casing 10 to rest against the bottom 15. The pressure disc 28, spring 30 and cover 27 are then assembled in order, as shown in the drawings, and the cap 26 is finally screwed onto the casing 10, whereby the spring 30 is biased against the disc 28.

In use, a sample is weighed into a sample cup e.g. of about 2 c.c. capacity, which is then placed on the bottom of the reaction vessel. The solvent is pipetted into the vessel around the cup, and the reactor is sealed. It is then inverted to bring the sample into contact with the solvent. Since the sample may have a tendency to creep up the walls of the reaction vessel in advance of the solvent, it is adviseable to shake the reactor periodically to ensure complete dissolution. The reaction vessel is pressurized by the gases e.g. hydrogen generated in the chemical reaction taking place between the solvent and sample. Approximately twenty to thirty minutes is required to complete sample dissolution and de-pressurize the bomb.

Controlled de-pressurization of the reactor is effected as follows. Upon disassembly, when the internal pressure exceeds a certain level, the pressure relief plug lifts against the diaphragm creating access to the vapor trap where any escaping reactants are collected. As a result, some of the sample either dissolved in liquid or vapor form tends to escape into the vapor trap where it condenses. Thus, none of the sample is lost, since it may be readily collected and added as "washings" to the dissolved sample prior to analysis. Pressure relief is created when the plug lifts against the diaphragm thus giving access to a larger area i.e. annular vapor trap.

When using acid-based solvent systems, reaction of the acid solvent with the sample is spontaneous and proceeds vigorously. It is most preferable, therefore, to isolate the sample from the solvent until the reactor is closed.

Using this technique with a 50 c.c. vessel and a solvent system comprising by volume, 30% concentrated HCl, 10% concentrated $HNO_3$, 10% concentrated HF and 50% distilled water, samples of up to 200 mg. could be dissolved without difficulty, including aluminum alloys containing almost twenty percent by weight silicon. This solvent system was used in conjunction with the novel apparatus in order to completely dissolve all the constituents that normally comprise aluminum alloys having a high silicon content.

Samples of an aluminum alloy containing up to 20% by weight silicon were prepared by transferring 200 mg. quantities into the sample cup, and placing it in the bottom of the reaction vessel to which had been delivered 8.0 ml. of the aforementioned solvent system. The reaction vessel and outer casing were then carefully reassembled, ensuring that the acid mix and the alloy did not come into contact. After assembly, the reactor was inverted and shaken vigorously and then allowed to stand in a cool water bath for a period of approximately 30 minutes. Using this solvent the reaction proceeds spontaneously and no additional external heat is required to ensure completion of the reaction. Although the reaction initially is spontaneous and proceeds vigorously, it does less so with high-silicon alloys. If the sample were finely-divided, reaction time would probably be shorter. However, it is often convenient to use chips or turnings, and these can be taken in within the prescribed 30 minutes.

The bomb was then carefully opened and the contents including washings from the vapor trap and diaphragm were transferred to a graduated plastic (eg: polypropylene) cylinder and diluted to a volume of 80.0 ml. with distilled water. This yielded a sample solution for analysis in which the final alloy concentration was 2.5 mg/ml in a 5% v/v acid mixture.

To utilize the high-precision reactor to dissolve natural materials, (e.g. marine sediments, clay, granite) as a preliminary step of chemical analysis, finely-ground sample is intimately mixed with high-purity aluminum powder (or, if aluminum is to be determined zinc may be substituted) and placed in the sample cup. The cup is then placed in the reaction vessel in isolated from the acid mix, the reactor is sealed and inverted to bring the contents into contact and, following a 30-minute reaction time, during which the reactor is continuously rotated at $\simeq 60$ rpm (a Fisher-Kendall mixer was used), the dissolved sample is removed for analysis. In this case, the reaction is initially sluggish and needs forcing by the internal heat, pressure and, probably, the hydrogen gas generated by the aluminum/acid reaction. Consequently, intimate contact between reactants, achieved by fine sub-division and intimate mixing, is essential in this case.

The solvent mixture found most effective for the natural materials examined was as follows: by volume, 50% concentrated hydrofluoric acid, 15% concentrated hydrochloric acid, 10% concentrated nitric acid, and 25% distilled water. (Note: to prevent leakage due to excessive pressure buildup during reaction, the solvent must contain a minimum of 25% water). Complete dissolution of each of the three materials examined occurred under the following conditions:

- Granite rock—50 mg pulverized sample, 100 mg aluminum powder 16 ml acid mixture. Reaction time is 30 minutes with continuous agitation.
- Clay—75 mg pulverized sample, 75 mg aluminum powder, 16 ml acid mixture. Reaction time is 30 minutes with continuous agitation.
- Marine sediment—50 mg pulverized sample, 100 mg aluminum powder, 16 ml acid mixture. Reaction time is 30 minutes with continuous agitation.
- Note: The above treatments require no further heating or chemical additions following the bomb reaction. If a boric acid addition (2 g) is made following the bomb reaction, and the sample is heated (to $\simeq 95°$ C.), sample sizes may be increased by 25 mg.

None of the above samples could be completely dissolved by conventional treatment in an open plastic beaker on the hotplate.

The reactor may also be used to accelerate the dissolution of elemental silicon. Treatment conditions are as follows:

- Intimately mix 175 mg pulverized silicon with 50 mg of pure aluminum powder and transfer to sample cup. Separately add 16 ml of acid mix (consisting of by volume, 30% conc. HF, 20% conc. HCl, 10% conc. $HNO_3$ and 40% distilled water) to the reactor vessel. Seal the reactor, invert to mix contents, and allow reaction to proceed for 30 minutes with intermittent hand shaking.

By conventional treatment in an open beaker, in excess of three hours is required to effect complete dissolution of the powdered silicon, largely because of poor wettability, which causes the element to creep up the walls of the reaction vessel in advance of the solvent.

Returning to the question of operating limits, for alloys containing less than 13% silicon, the maximum sample size is 200 mg with 8 ml of acid mix (mixture of by volume, 30% concentrated HCl, 10% concentrated HNO$_3$, 10% concentrated HF and 50% distilled water addition.) or 250 mg with 16 ml of acid mix. The aluminum alloys containing metals that tend to increase reactivity, e.g., magnesium, are best done at the lower limits. The more resistant aluminum-silicon alloys require the upper limit of acid to go to completion.

For alloys containing more than 13% silicon, the maximum sample size is 300 mg with 16 ml. of acid mix.

Whereas the invention has been described with reference to the dissolution of siliceous materials in an acid-based solvent, it will be appreciated that the novel apparatus is equally applicable to the digestion of other difficulty soluble substance including organic materials. Thus the specific embodiment described herein is to be considered in all respects as illustrative and by no means restrictive.

The embodiments of the invention in which an exclusive property or privilege is claimed are defined as follows:

1. In an apparatus for dissolving a difficultly soluble substance under pressure, said apparatus comprising an outer casing, a close-fitting reaction vessel adapted to be received within said outer casing, a first closure member for said reaction vessel, and a second closure member for said casing to prevent the first closure member from becoming unseated when the reaction vessel is pressurized, the improvement comprising a vapor trap for collecting and retaining reactants which tend to escape from the reaction vessel upon de-pressurization of the apparatus, wherein said first closure member includes an opening, an external diaphragm member to close said opening and a pressure relief plug which when positioned in said opening, together with said diaphragm member, defines said vapor trap.

2. An apparatus according to claim 1, including a sample receiving cup for isolating a sample to be decomposed from a solvent prior to assembly of the apparatus.

3. An apparatus according to claim 1, wherein the reaction vessel, the first closure member, the pressure relief plug and the diaphragm member are all constructed of polytetrafluoroethylene.

4. An apparatus according to claim 1 or 2, wherein the reaction vessel includes an external threaded portion and wherein said first closure member includes an interior threaded portion for cooperative sealing engagement therebetween, to prevent leakage of the react products.

* * * * *